United States Patent
Uedaira

(10) Patent No.: US 9,952,035 B2
(45) Date of Patent: Apr. 24, 2018

(54) PROXIMITY SENSOR

(71) Applicant: Rohm Co., Ltd., Kyoto (JP)

(72) Inventor: Yoshitsugu Uedaira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/172,436

(22) Filed: Jun. 3, 2016

(65) Prior Publication Data

US 2016/0356642 A1    Dec. 8, 2016

(30) Foreign Application Priority Data

Jun. 8, 2015   (JP) ................... 2015-116001

(51) Int. Cl.
| | | |
|---|---|---|
| *G01J 1/02* | (2006.01) | |
| *G01B 11/14* | (2006.01) | |
| *G01J 1/44* | (2006.01) | |
| *G06F 3/041* | (2006.01) | |
| *G06F 3/042* | (2006.01) | |
| *G01J 1/06* | (2006.01) | |
| *G01J 1/08* | (2006.01) | |
| *G01J 1/42* | (2006.01) | |

(52) U.S. Cl.
CPC .......... *G01B 11/14* (2013.01); *G01J 1/06* (2013.01); *G01J 1/08* (2013.01); *G01J 1/4228* (2013.01); *G01J 2001/061* (2013.01)

(58) Field of Classification Search
CPC .......... G01J 1/0228; G01J 1/02; G01J 1/0204; G01J 1/0209; G01J 1/0214; G01J 1/0219; G01J 1/44; G01J 2001/446; G01J 2001/4466; G01J 2001/448; G01J 1/06; G01J 1/08; G01J 1/4228; G01J 2001/061; G01B 11/14

See application file for complete search history.

(56) References Cited

U.S. PATENT DOCUMENTS

| | | | | |
|---|---|---|---|---|
| 7,957,762 | B2 * | 6/2011 | Herz | G06F 1/3203 455/41.2 |
| 8,513,892 | B2 * | 8/2013 | Uedaira | G01J 1/02 250/208.2 |
| 8,675,008 | B2 * | 3/2014 | Tsuchikawa | G06F 3/0416 345/207 |
| 9,029,771 | B2 * | 5/2015 | Uedaira | G01S 17/026 250/338.4 |
| 9,052,390 | B2 * | 6/2015 | Hanada | G06F 3/0421 |
| 9,476,901 | B2 * | 10/2016 | Ishikawa | G01P 13/04 |
| 2006/0164241 | A1 * | 7/2006 | Makela | G08B 17/107 340/556 |
| 2010/0127159 | A1 * | 5/2010 | Watanabe | G01J 1/02 250/208.2 |
| 2010/0295781 | A1 * | 11/2010 | Alameh | G06F 3/0346 345/158 |
| 2011/0254864 | A1 * | 10/2011 | Tsuchikawa | G06F 3/0416 345/660 |
| 2011/0260629 | A1 * | 10/2011 | Uedaira | G01J 1/02 315/158 |

(Continued)

*Primary Examiner* — John Lee

(74) *Attorney, Agent, or Firm* — Fish & Richardson P.C.

(57) ABSTRACT

A proximity sensor which is capable of facilitating a measure against crosstalk for different sets is provided. The proximity sensor includes a light emitting device, and a light receiving device including a plurality of light receiving parts, wherein the light receiving device has a function of arbitrarily selecting any of the plurality of light receiving parts.

7 Claims, 10 Drawing Sheets

(56) References Cited

U.S. PATENT DOCUMENTS

| | | | |
|---|---|---|---|
| 2012/0286162 A1* | 11/2012 | Uedaira | G01S 17/026 |
| | | | 250/338.4 |
| 2013/0050068 A1* | 2/2013 | Inoue | G01J 1/4204 |
| | | | 345/102 |
| 2013/0153755 A1* | 6/2013 | Pikkujamsa | G01V 8/12 |
| | | | 250/221 |
| 2015/0010308 A1* | 1/2015 | Uedaira | H04B 10/116 |
| | | | 398/106 |
| 2015/0083900 A1 | 3/2015 | Caley et al. | |
| 2015/0083915 A1* | 3/2015 | Nakata | G01J 1/1626 |
| | | | 250/338.1 |
| 2015/0323670 A1* | 11/2015 | Shirasaka | G01P 13/00 |
| | | | 250/206.1 |
| 2015/0357483 A1* | 12/2015 | Lin | H01L 31/0203 |
| | | | 250/239 |
| 2015/0362594 A1* | 12/2015 | Bikumandla | G01S 17/026 |
| | | | 250/206.1 |
| 2015/0378013 A1* | 12/2015 | Bikumandla | G01S 17/026 |
| | | | 250/201.1 |
| 2016/0146938 A1* | 5/2016 | Becker | G01S 17/32 |
| | | | 250/208.2 |
| 2016/0356642 A1* | 12/2016 | Uedaira | G01J 1/0228 |
| 2016/0377762 A1* | 12/2016 | Uedaira | G01V 8/12 |
| | | | 250/221 |

\* cited by examiner

PROXIMITY SENSOR

CROSS-REFERENCE TO RELATED APPLICATION(S)

This application is based upon and claims the benefit of priority from Japanese Patent Application No. 2015-116001, filed on Jun. 8, 2015, the entire contents of which are incorporated herein by reference.

TECHNICAL FIELD

The present disclosure relates to an optical proximity sensor.

BACKGROUND

An optical proximity sensor detects the presence of a nearby object (the presence of reflection of emitted light by an object) by emitting infrared light from a light emitting device toward the outside of a set in which the optical proximity sensor installed and detecting reflected light returned from outside of the set by a light receiving device.

In this connection, many techniques have been conventionally proposed and disclosed.

Incidentally, a measure against crosstalk is very important to the optical proximity sensor in order to enhance its accuracy of detection.

FIG. 7 is a schematic view illustrating a conventional proximity sensor. Referring to this figure, a proximity sensor 300 is configured as a module including a substrate 310, a light emitting device 320, a light receiving device 330, a case member 340 and light condensing members 350 and 360. The light emitting device 320 is a light emitting diode. The light receiving device 330 has a single light receiving part 331 as a means for detecting light incident from the outside of a set (i.e., light reflected from an object).

Crosstalk occurring in the proximity sensor 300 may be caused by (1) reflected light Lx returned from a top surface 410 of an opening window 400, (2) reflected light Ly returned from a bottom surface of the opening window 400, and (3) leaked light Lz transmitted inside the module.

The crosstalk due to the reflected light Lx can be reduced substantially to zero by adjusting a gap d31 between the proximity sensor 300 and the opening window 400. However, in order to correctly detect the proximity of an object in which infrared light does not reflect off of well (such as a black hair), it may be difficult to reduce the crosstalk to zero.

The crosstalk due to the reflected light Ly can also be reduced substantially to zero by adjusting the gap d31.

The crosstalk due to the leaked light Lz can be reduced substantially to zero by a module design (such as thickening of a light shielding wall member 341, or adjustment of a distance d32 between light emitting and light receiving by the light emitting device 320 and the light receiving device 330).

A measure against the above-described conventional crosstalk has basically been achieved by adjusting the gap d31 between the proximity sensor 300 and the opening window 400.

FIGS. 8 to 10 are schematic views illustrating variations (first to third examples) of a gap adjusting method, respectively.

In the first example of FIG. 8, gap adjustment is achieved by installing an interposer (pedestal) 600 between the proximity sensor 300 and a printed circuit board 500. The proximity sensor 300 and the printed circuit board 500 are electrically interconnected through a via (not shown) formed inside the interposer 600.

In the second example of FIG. 9, gap adjustment is achieved by bending a flexible circuit board 700 on which the proximity sensor 300 is mounted, and interposing a thick member 800 (such as sponge rubber).

In the second example of FIG. 10, gap adjustment is achieved by installing a thick member 900 (such as sponge rubber) on the top surface of the proximity sensor 300. The thick member 900 has openings 910 and 920 formed respectively to correspond to light condensing members 350 and 360 of the proximity sensor 300. The second example (FIG. 9) and the third example (FIG. 10) may be used in combination.

According to the above-described conventional gas adjusting methods, since the gap d31 can be arbitrarily adjusted, it is possible to reduce crosstalk due to the reflected lights Lx and Ly.

However, the gap adjusting methods of the second example (FIG. 9) and the third example (FIG. 10) have problems in that deviation of the gap d31 and a wobble of the thick members 800 and 900 are likely to occur and the effect of reduction of the crosstalk becomes unstable.

In addition, in the above-described conventional gap adjusting methods, separate gap adjusting members 600, 800 and 900 in addition to the proximity sensor 300 are required and a plurality of gap adjusting members 600, 800 and 900 having an optimized thickness for different sets having different specifications should be prepared, so that there are problems in that work burden increases and the cost of the entire set increases.

SUMMARY

The present disclosure provides some embodiments of a proximity sensor which is capable of facilitating a measure against crosstalk for different sets.

According to one embodiment of the present disclosure, there is provided a proximity sensor including: a light emitting device; and a light receiving device including a plurality of light receiving parts, wherein the light receiving device has a function of arbitrarily selecting any of the plurality of light receiving parts.

The plurality of light receiving parts may be arranged on a surface of the light receiving device along a direction in which the light emitting device and the light receiving device are lined up.

The light receiving device may include: an interface part which exchanges a signal with an external device; a register part which stores a control parameter input from the external device; and a control part which selects light receiving parts to be used, among the plurality of light receiving parts, based on the control parameter.

The control part may select only one light receiving part and output a detection signal obtained in the selected light receiving part, as a sensor output signal, to the external device.

The control part may select two or more light receiving parts and output a synthesized result of detection signals obtained in the selected light receiving parts, as a sensor output signal, to the external device.

The light emitting device may be a surface emission laser element.

The proximity sensor may further include a transparent sealing member which integrally seals the light emitting device and the light receiving device without optical isolation between the light emitting device and the light receiving device.

The light emitting device may be a light emitting diode element.

The proximity sensor may further include a light shielding wall member for optical isolation between the light emitting device and the light receiving device.

According to another embodiment of the present disclosure, there is provided an electronic apparatus including: the above-described proximity sensor; and a housing including an opening window formed to face the proximity sensor.

DETAILED DESCRIPTION

<First Embodiment>

Figure 1:
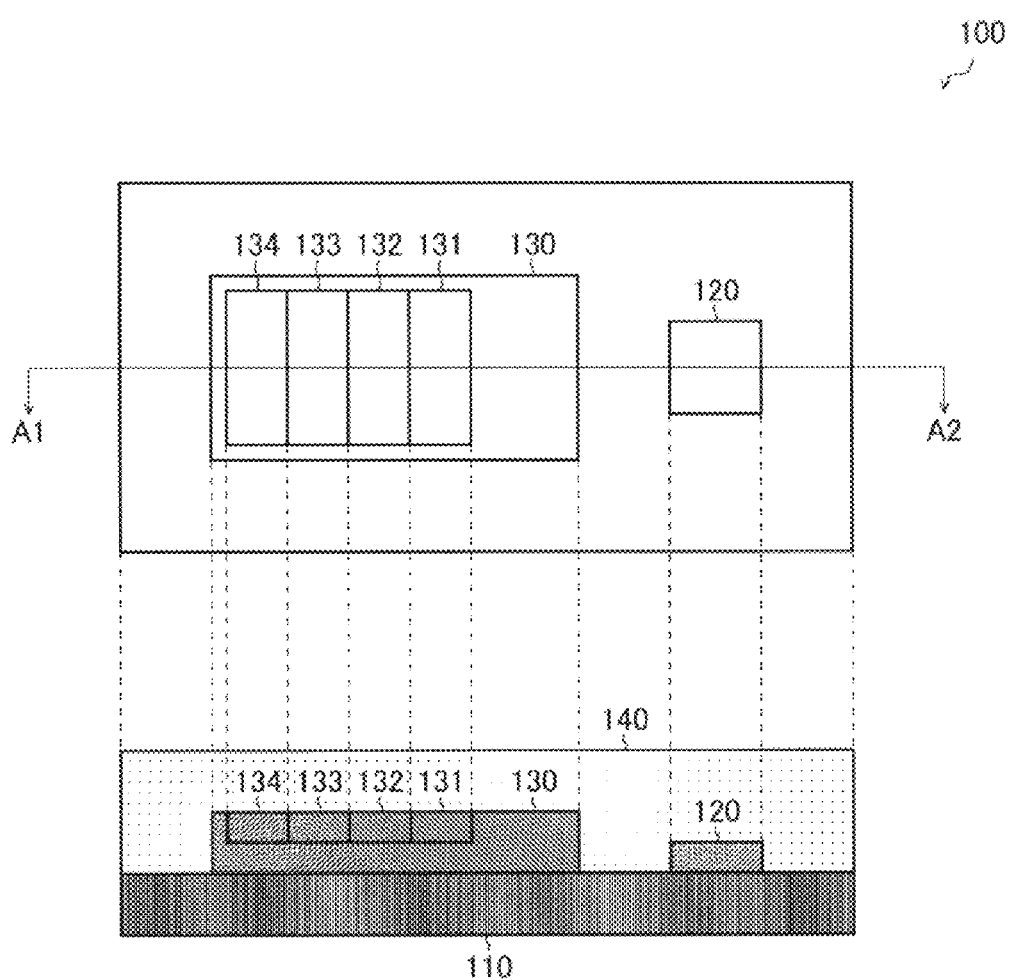
FIG. 1 is a schematic view illustrating a proximity sensor according to a first embodiment.

FIG. 1 is a schematic view illustrating a proximity sensor according to a first embodiment. A schematic top view of a proximity sensor 100 is depicted in the upper portion of FIG. 1 and an A1-A2 cross-sectional view thereof is depicted in the lower portion of FIG. 1.

The proximity sensor 100 of this embodiment is configured as a module including a substrate 110, a light emitting device 120, a light receiving device 130 and a sealing member 140.

The substrate 110 is a plate-like member supporting the light emitting device 120 and the light receiving device 130.

The light emitting device 120 is a semiconductor device which emits light toward the outside of a set containing the proximity sensor 100. In the proximity sensor 100 of this embodiment, a surface emission laser element in which the resonance direction of light is perpendicular to the surface of a substrate (a so-called VCSEL (Vertical Cavity Surface Emitting Laser) laser element) is used as the light emitting device 120.

The surface emission laser element has a smaller directional angle of emitted light, compared with a light emitting diode element. Therefore, since crosstalk due to leaked light transmitted inside the module is not considered, it is possible to reduce the distance between light emitting and light receiving, which separates the light emitting device 120 and the light receiving device 130, without any light shielding wall member. Thus, the diameter of an opening window formed in the set can be reduced, so that the design of the set can be improved. In addition, there is no need to provide a light condensing member for converging light emitted from the light emitting device 120.

The light receiving device 130 is a semiconductor integrated circuit device (light receiving IC) which receives light incident from the outside of the set. In the proximity sensor 100 of this embodiment, the light receiving device 130 includes a plurality of light receiving parts 131 to 134 formed on the surface thereof, and has a function of selecting any light receiving part to be used (which will be described in detail later).

As shown in this figure, the light receiving parts 131 to 134 are arranged on the surface of the light receiving device 130 along a direction in which the light emitting device 120 and the light receiving device 130 are lined up. In the example of this figure, the light receiving parts 131 to 134 are locally arranged at a relatively distant area as viewed from the light emitting device 120. A variety of circuit elements required for the light receiving device 130 may be formed in an area in which the light receiving parts 131 to 134 are not arranged (i.e., area not receiving the light).

However, the array layout of the light receiving parts 131 to 134 is just an illustrative example, but the light receiving parts may have other array layouts. In addition, the number of light receiving parts used may be optional (for example, two or more).

The sealing member 140 is a transparent resin member for integrally sealing the light emitting device 120 and the light receiving device 130 without optical isolation between the light emitting device 120 and the light receiving device 130.

Figure 2:
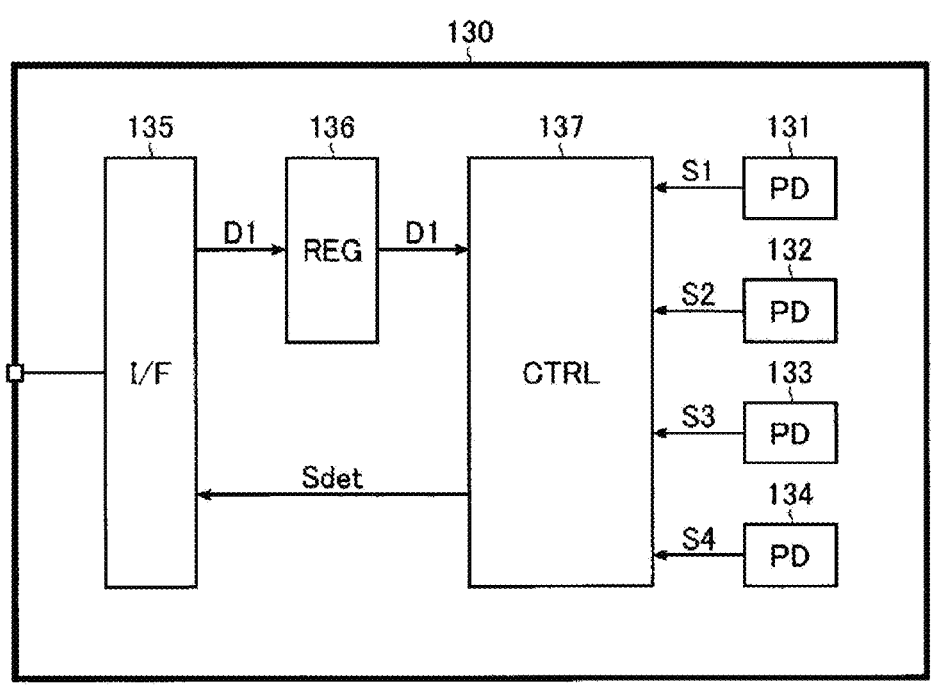
FIG. 2 is a block diagram showing one configuration example of a light receiving device.

FIG. 2 is a block diagram showing one configuration example of the light receiving device 130. The light receiving device 130 of this configuration example includes an interface part 135, a register part 136 and a control part 137 in addition to the above-described light receiving parts 131 to 134.

The light receiving parts 131 to 134 are light receiving elements (such as photodiodes and phototransistors) having their respective sensitivity peaks at a wavelength of light emitted from the light emitting device 120, and output their respective detection signals S1 to S14 depending on the amount of light received.

The interface part 135 is a front end means for exchanging signals with an external device in conformity to a predetermined communication protocol (such as an I²C protocol).

The register part 136 stores a control parameter D1, in a volatile or nonvolatile manner, which is input from the external device via the interface part 135.

Based on the control parameter D1 read from the register part 136, the control part 137 selects a light receiving part to be actually used, among the light receiving parts 131 to 134. More specifically, the control part 137 is in charge of supply/stop of power to the light receiving parts 131 to 134 and is configured to supply power to only a light receiving part to be used. Such a configuration prevents power from being wasted in other unused light receiving parts.

Note that the method of selecting a light receiving part can be modified in different ways. For example, the control part 137 may select only one light receiving part to be actually used, among the light receiving parts 131 to 134, and output a detection signal obtained in the selected light receiving part, as a final sensor output signal Sdet, to the external device via the interface part 135.

As an alternative, the control part 137 may selects two or more light receiving parts to be actually used, among the light receiving parts 131 to 134, and output a combination (such as the sum or average) of detection signals obtained in the selected light receiving parts, as a final sensor output signal Sdet, to the external device via the interface part 135.

Figure 3:
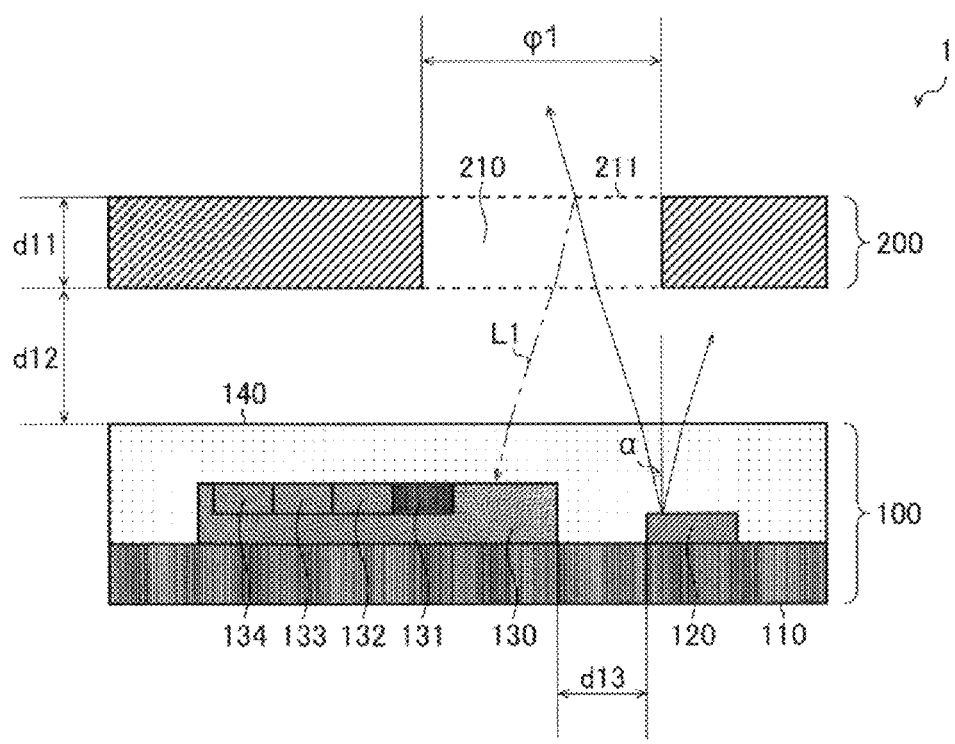
FIG. 3 is a schematic view showing a first configuration example of an electronic apparatus.

FIG. 3 is a schematic view showing a first configuration example of an electronic apparatus equipped with the proximity sensor 100. An electronic apparatus 1 of this configuration includes the proximity sensor 100 and a housing 200 supporting the proximity sensor 100. The housing 200 has a transparent opening window 210 formed to face the proximity sensor 100. As dimensions of the set, it is assumed that a housing thickness is d11, a gap is d12, a distance between light emitting and light receiving is d13, an opening window diameter is φ1, and an emission angle is α.

Here, crosstalk due to reflected light L1 returned from a top surface 211 of the opening window 210 is considered.

In the electronic apparatus 1 of this first example, light emitted from the light emitting device 120 is reflected at the top surface 211 of the opening window 210 and is retuned, as the reflected light L1, to the light receiving device 130. However, in the example of this figure, the reflected light L1 strikes only a non-light receiving area (an area in which the light receiving parts 131 to 134 are not arranged). Therefore, even when any of the light receiving parts 131 to 134 is used, the reflected light L1 causing the crosstalk is not detected.

In such a situation, when the light receiving part 131 formed at the nearest position as viewed from the light emitting device 120 is selected, it is possible to cope with a small opening window diameter φ1. In addition, the light receiving parts 132 to 134 may be used in combination as necessary.

Figure 4:
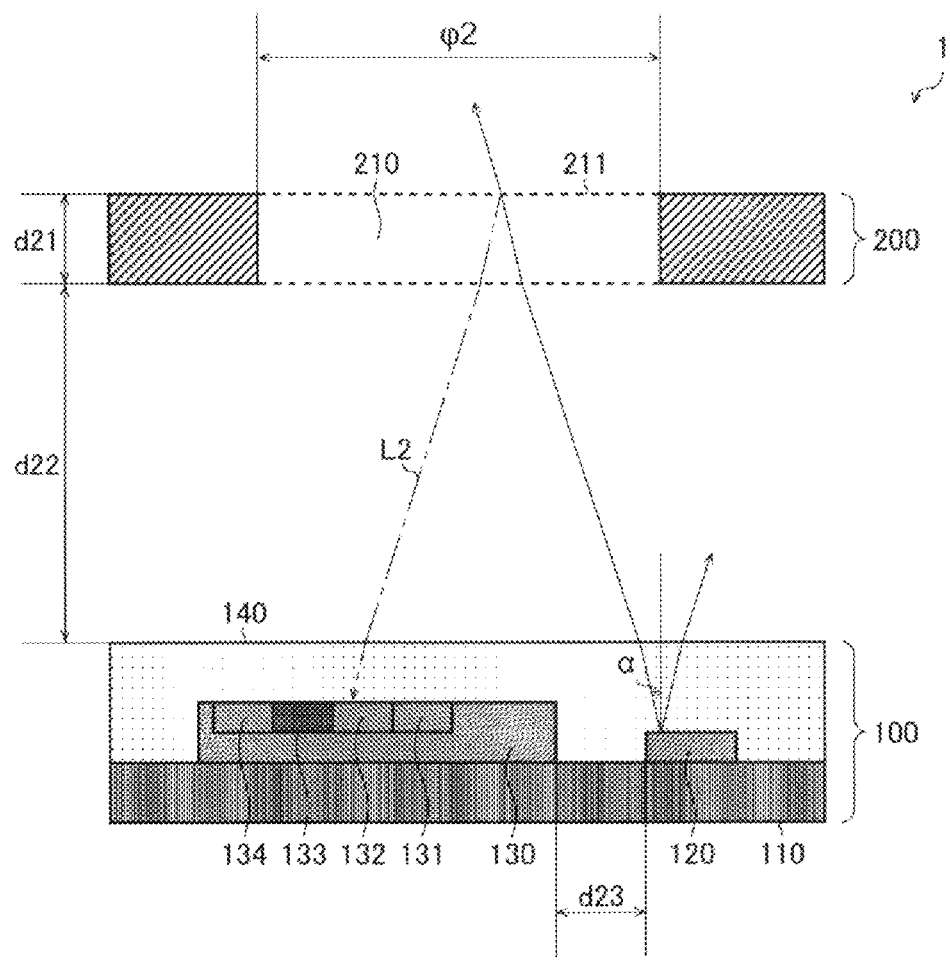
FIG. 4 is a schematic view showing a second configuration example of the electronic apparatus.

FIG. 4 is a schematic view showing a second configuration example of the electronic apparatus. The electronic apparatus 1 of this configuration example has basically the same configuration as that of the first configuration example except for the dimensions of the set (a housing thickness d21, a gap d22, a distance d23 between light emitting and light receiving, an opening window diameter φ2 and an emission angle α). More specifically, in the second configuration example, the gap d22 and the opening window diameter φ2 are designed to be larger than those of the first configuration example (d22>d12 and φ2>φ1).

As before, a crosstalk due to reflected light L2 returned from the top surface 211 of the opening window 210 is considered.

Similarly, in the electronic apparatus 1 of the second example, light emitted from the light emitting device 120 is reflected at the top surface 211 of the opening window 210 and is retuned, as reflected light L2, to the light receiving device 130. Here, in the example of this figure, the reflected light L2 strikes a portion (the light receiving parts 131 and 132) of a light receiving area. Therefore, when the light receiving part 131 or 132 is used, there is a possibility that the reflected light L2 causing the crosstalk is detected.

In such a situation, it is understood that it is better to select the light receiving part 133 or 134 formed at a more distant position than the light receiving part 132 as viewed from the light emitting device 120.

As shown in the first example (FIG. 3) and the second example (FIG. 4), by forming the plurality of light receiving parts 131 to 134 on the surface of the light receiving device 130 and allowing any light receiving part to be arbitrarily selected, as a crosstalk countermeasure for each of different sets of different standards, a complicated gap adjustment is basically unnecessary. Therefore, since the crosstalk countermeasure for each set is easy and inexpensive, it is possible to enhance the flexibility of set design.

In addition, since calibration (adjustment at shipment) is made for proximity sensors 100 mounted on sets of the same standard, it is possible to increase the reliability of products.

In addition, as one example of methods of selecting the light receiving parts 131 to 134, while light is emitted from the light emitting device 120 under a situation of not approaching any object to the proximity sensor 100, among detection signals S1 to S4 generated respectively in the light receiving parts 131 to 134, a detection signal whose level is below a threshold (a detection signal which does not detect unnecessary reflected light which is likely to cause a crosstalk) may actually be used.

In addition, as described earlier, in the proximity sensor 100 of the first embodiment, since the surface emission laser element is used as the light emitting device 120, a single mold package by the sealing member 140 may be employed.

<Second Embodiment>

Figure 5:
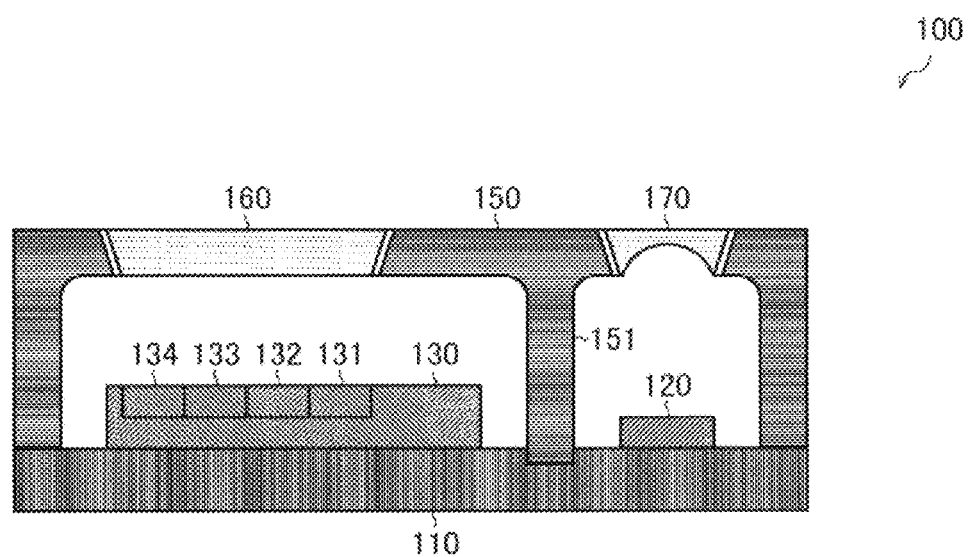
FIG. 5 is a schematic view illustrating a proximity sensor according to a second embodiment.

FIG. 5 is a schematic view illustrating a proximity sensor according to a second embodiment. The proximity sensor 100 of this embodiment has basically the same configuration as that of the first embodiment in that the light receiving device 130 includes the plurality of light receiving parts 131 to 134. However, this embodiment is different from the first embodiment in that a light emitting diode element is used as the light emitting device 120. In this embodiment, the same elements as the first embodiment are denoted by the same reference numerals as FIG. 1 and, therefore, duplicated explanation will be omitted. The following description will be focused on characteristic portions of the second embodiment.

The light emitting diode element has a larger directional angle of emitted light compared with the surface emission laser element. Therefore, when the light emitting diode element is used as the light emitting device 120, there is a need to cover the light emitting device 120 and the light receiving device 130 with a light shielding case member 150 and to install a light shielding wall member 151 making optical isolation between the light emitting device 120 and the light receiving device 130. In addition, the case member 150 is provided with transparent light condensing members 160 and 170 formed at positions respectively facing the light emitting device 120 and the light receiving device 130.

Figure 7:
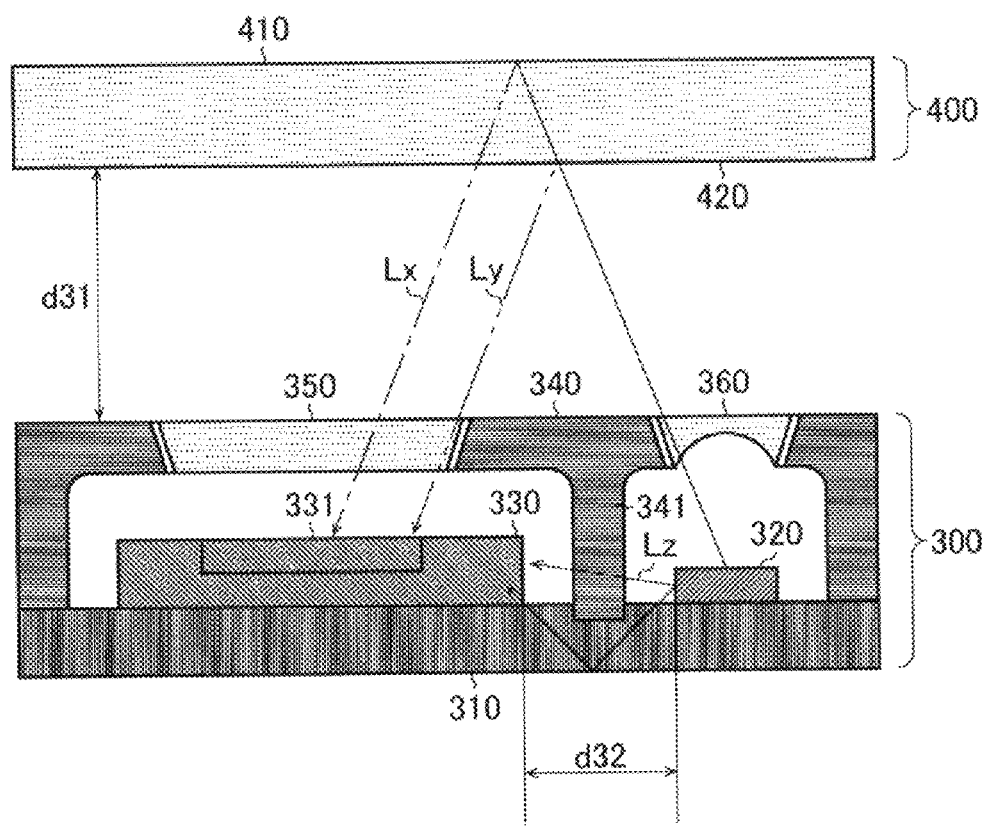
FIG. 7 is a schematic view illustrating a conventional proximity sensor.
Figure 8:
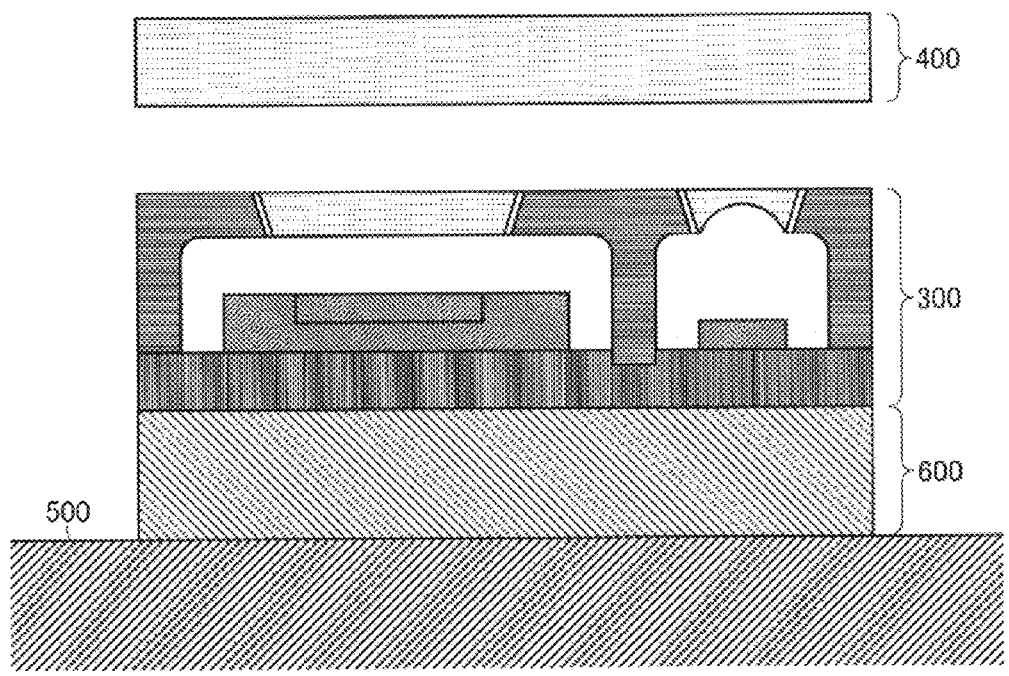
FIG. 8 is a schematic view showing a first example of a gap adjusting method.
Figure 9:
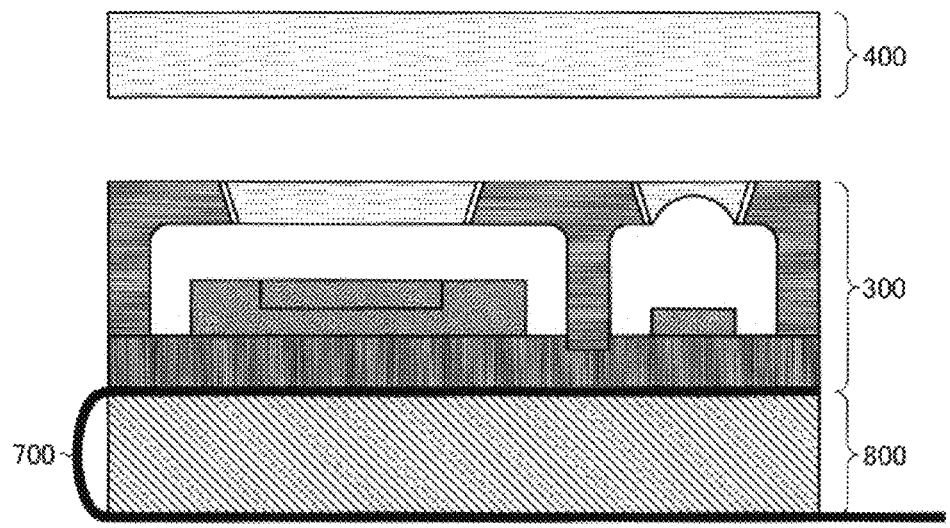
FIG. 9 is a schematic view showing a second example of the gap adjusting method.
Figure 10:
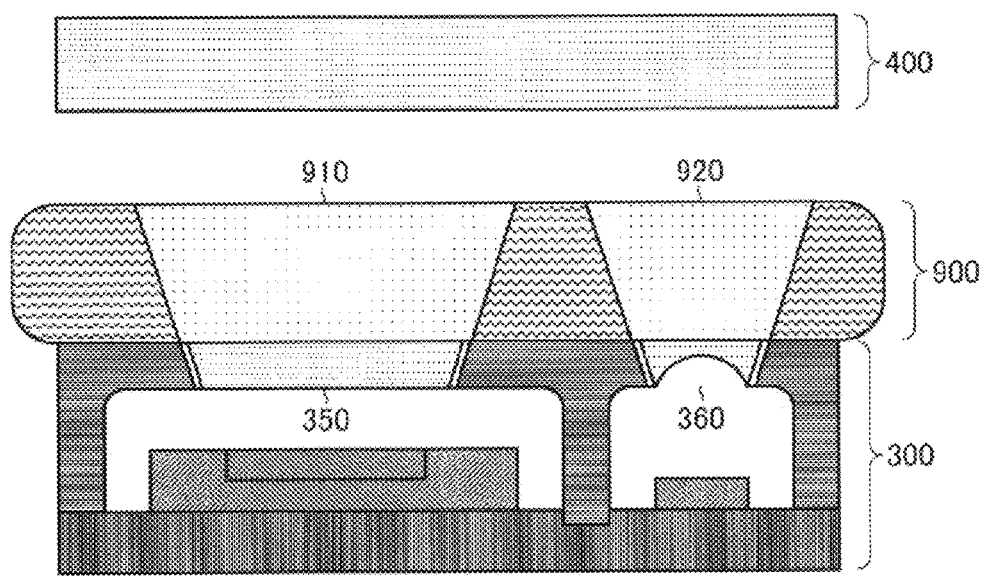
FIG. 10 is a schematic view showing a third example of the gap adjusting method.

In other words, the proximity sensor 100 of the second embodiment is configured by increasing the number of the light receiving parts by two or more, and to have a function capable of selecting any of these light receiving parts on the basis of the proximity sensor 300 of the conventional example (FIG. 7). With this configuration, like the above first embodiment, as a crosstalk countermeasure for each of the sets having different standards, a complicated gap adjustment is basically unnecessary. Therefore, it is possible to enhance the flexibility of set design.

<Applications to Smartphone>

Figure 6:
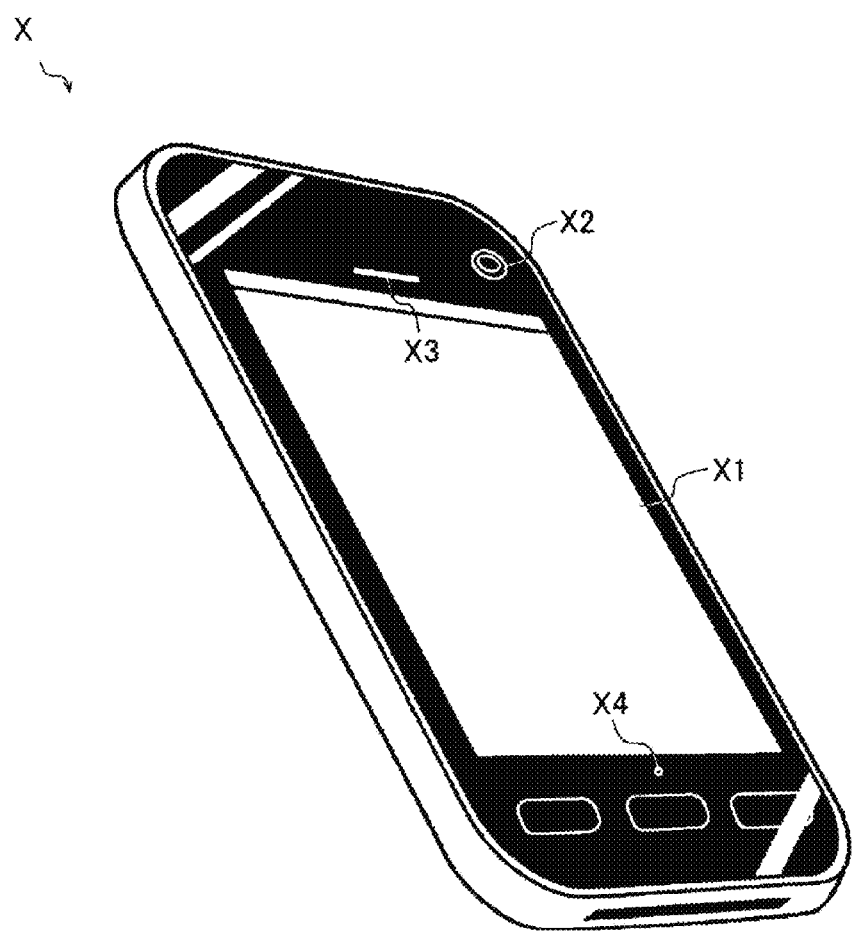
FIG. 6 is an external view of a smartphone.

FIG. 6 is an external view of a smartphone. As one example of the electronic apparatus 1, a smartphone X apparently includes a display screen X1 (such as a liquid crystal display or an organic EL (Electro-Luminescence) display) with a touch panel function, an optical proximity sensor X2, a speaker X3 and a microphone X4.

At the time of a voice call on the smartphone X, a user's ear and mouth are close to the speaker X3 and the microphone X4. At this time, as a user's cheek approaches the display screen X1 the proximity sensor X2 detects this approach and a touch function of the display screen X1 is turned off, thereby preventing a touch operation unintended at the time of voice call.

In addition, the proximity sensor 100 described so far is suitable to be used as the proximity sensor X2.

INDUSTRIAL APPLICABILITY

The present disclosure described in the specification can be used for portable electronic apparatuses (such as a smartphone, digital cameras and so on).

According to the present disclosure in some embodiments, it is possible to provide a proximity sensor which is capable of facilitating measures against crosstalk for different sets.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A proximity sensor comprising:
   a light emitting device; and
   a light receiving device including a plurality of light receiving parts arranged on a surface of the light receiving device along a direction in which the light emitting device and the light receiving device are lined up,
   wherein the light receiving device includes:
      an interface operable to exchange a signal with an external device;
      a register operable to store a control parameter received from the external device; and
      a controller operable to select any of the plurality of light receiving parts according to the control parameter,
   wherein the plurality of light receiving parts include:
      a first light receiving part affected by crosstalk;
      a second light receiving part positioned adjacent to the first receiving part and not affected by the crosstalk; and
      a third light receiving part positioned farther from the first light receiving part than the second light receiving part along a direction in which the light emitting device and the light receiving device are arranged, and not affected by the crosstalk, and wherein the controller is operable to select the second light receiving part to be used, without selecting the first and third receiving parts.

2. The proximity sensor of claim 1, wherein the controller is operable to output a detection signal obtained in the selected second light receiving part, as a sensor output signal, to the external device.

3. The proximity sensor of claim 1, wherein the light emitting device is a surface emission laser element.

4. The proximity sensor of claim 3, further comprising a transparent sealing member which integrally seals the light emitting device and the light receiving device without optical isolation between the light emitting device and the light receiving device.

5. The proximity sensor of claim 1, wherein the light emitting device is a light emitting diode element.

6. The proximity sensor of claim 5, further comprising a light shielding wall member for optical isolation between the light emitting device and the light receiving device.

7. An electronic apparatus comprising:
   A proximity sensor of claim 1; and
   a housing including an opening window formed to face the proximity sensor.

* * * * *